United States Patent [19]
Ezzet et al.

[11] Patent Number: 5,414,817
[45] Date of Patent: May 9, 1995

[54] ADAPTER UNIT FOR CONNECTING A MOBILE COMPUTER TO A NETWORK AND FOR SIMULATING THE PRESENCE OF THE MOBILE COMPUTER WHEN THE MOBILE COMPUTER IS NOT PRESENT

[75] Inventors: Ali S. Ezzet, Sunnyvale; Carol E. Bassett, Cupertino, both of Calif.; Mark L. Brown, Boise, Id.; Mark A. Thompson, San Jose; Richard M. Archuleta, Mountain View, both of Calif.

[73] Assignee: Hewlett-Packard Company, Palo Alto, Calif.

[21] Appl. No.: 185,763

[22] Filed: Jan. 24, 1994

Related U.S. Application Data

[63] Continuation of Ser. No. 982,961, Nov. 30, 1992, abandoned.

[51] Int. Cl.⁶ ............................................. G06F 13/00
[52] U.S. Cl. .................................. 395/275; 395/200; 364/239.8; 364/242.5; 364/940; 364/DIG. 1
[58] Field of Search ............... 395/200, 275; 364/200, 364/900

[56] References Cited

U.S. PATENT DOCUMENTS

| | | | |
|---|---|---|---|
| 3,899,772 | 8/1975 | Mead et al. | 364/200 |
| 4,651,316 | 8/1987 | Kocan et al. | 370/85 |
| 4,686,690 | 8/1987 | Sato | 375/114 |
| 4,725,537 | 2/1988 | Nichols | 370/85 |
| 4,845,717 | 7/1989 | Iijima | 371/60 |
| 4,910,507 | 3/1990 | Shimizu et al. | 340/825.5 |
| 4,910,677 | 3/1990 | Remedio et al. | 364/410 |
| 5,088,112 | 2/1992 | Phyälammi et al. | 375/76 |
| 5,109,393 | 4/1992 | Saegusa | 375/108 |
| 5,113,416 | 5/1992 | Lindell | 375/97 |
| 5,185,857 | 2/1993 | Rozmanith et al. | 395/148 |
| 5,193,149 | 3/1993 | Awiszio et al. | 395/200 |
| 5,218,618 | 6/1993 | Sagey | 375/1 |

*Primary Examiner*—Christopher B. Shin

[57] ABSTRACT

An adapter system for coupling a mobile computer to a computer network is disclosed. When the mobile computer is not connected to the computer network, the invention stores network messages intended for the mobile computer. When the mobile computer is reconnected to the computer network, the adapter system sends the messages received in its absence to the mobile unit in the order the messages were received.

3 Claims, 2 Drawing Sheets

ADAPTER UNIT FOR CONNECTING A MOBILE COMPUTER TO A NETWORK AND FOR SIMULATING THE PRESENCE OF THE MOBILE COMPUTER WHEN THE MOBILE COMPUTER IS NOT PRESENT

CROSS REFERENCE APPLICATION

This is a continuation of application Ser. No. 07/982,961, filed on Nov. 30, 1992, now abandoned

FIELD OF THE INVENTION

The present invention relates to computer systems, and more particularly, to systems for connecting a portable computer to a computer network.

BACKGROUND OF THE INVENTION

Computer networks form an increasingly important part of many computing environments. Such networks provide a means for storing information which is to be shared by a number of users and for providing communication services, such as E-mail, between users. Unfortunately, computer networks are designed with a stationary user in mind. In general, the network connects a number of stationary computers connected by relatively fixed communication links. Normally, the user is wired to a file server or uses a short range radio or optical link to connect to the server. When the user travels to a location that is not connected to the server, the user loses much of the benefit of the network.

A number of prior art systems have been implemented for the purposes of providing network access to the traveling employee. These systems can be divided roughly into two categories. The simplest systems are analogous to docking stations. The traveling employee uses a portable computer. When the employee is on the premises which are connected to the network, the employee plugs his or her computer into an interface referred to as a docking station. The docking station then provides connection to the file server. The docking station is a very economical solution to the problem of the traveling employee when the employee is on the premises connected to the network or connected to the docking station by modem. Unfortunately, when the employee is traveling, he or she is not connected to the network. As a result, E-mail messages and other "real-time" network services are not available. Further, messages sent to the employee's station are often lost, since the portable computer has been removed from the network.

The second solution for providing network access to the traveling employee is to leave a fixed computer connected to the network at all times. The traveling employee than controls this fixed computer via telephone lines from his portable computer. While this solution avoids the data loss problems associated with docking stations, it requires a dedicated computer to maintain the employee's presence on the network. Furthermore, many applications can not be effectively run over a low bandwidth communication link such a telephone line. For example, applications that utilize graphical interfaces are difficult to run because each time the screen is updated, the system must pause for several seconds to allow the graphical information to be transmitted over the telephone line. Hence, such remote control systems are seldom used for operations other than transferring files to and from the network to the remote computer.

In addition, the employee must transfer files to and from the fixed computer. When the employee leaves on a trip, he or she must transfer files from the fixed computer and/or network to his or her portable computer. Similarly when the employee returns, the files that have been altered must be transferred back to the network from the portable computer via the fixed computer. These file transfer operations require the employee to physically connect the two computers in addition to giving the appropriate commands needed to transfer the files.

Broadly, it is the object of the present invention to provide an improved apparatus for providing network access.

It is a further object of the present invention to provide a network access system which preserves information sent to a user's station when the user is not connected to that station without the need to dedicate a computer to that station at all times.

These and other objects of the present invention will become apparent to those skilled in the art from the following detailed description of the invention and the accompanying drawings.

SUMMARY OF THE INVENTION

The present invention comprises an adapter unit for connecting a mobile computer to a computer network. The adapter unit is connected to the network and has an interface which allows connection to the mobile computer when the computer is present at the network site. This interface also includes circuitry for detecting the presence of the mobile unit. The adapter unit includes a FIFO buffer for storing network messages directed to the mobile computer when the mobile computer is not connected to the network. When the adapter detects the presence of a mobile unit connected thereto, it plays back the messages stored therein to the mobile unit in the order in which the messages were received.

DETAILED DESCRIPTION OF THE INVENTION

Figure 1:
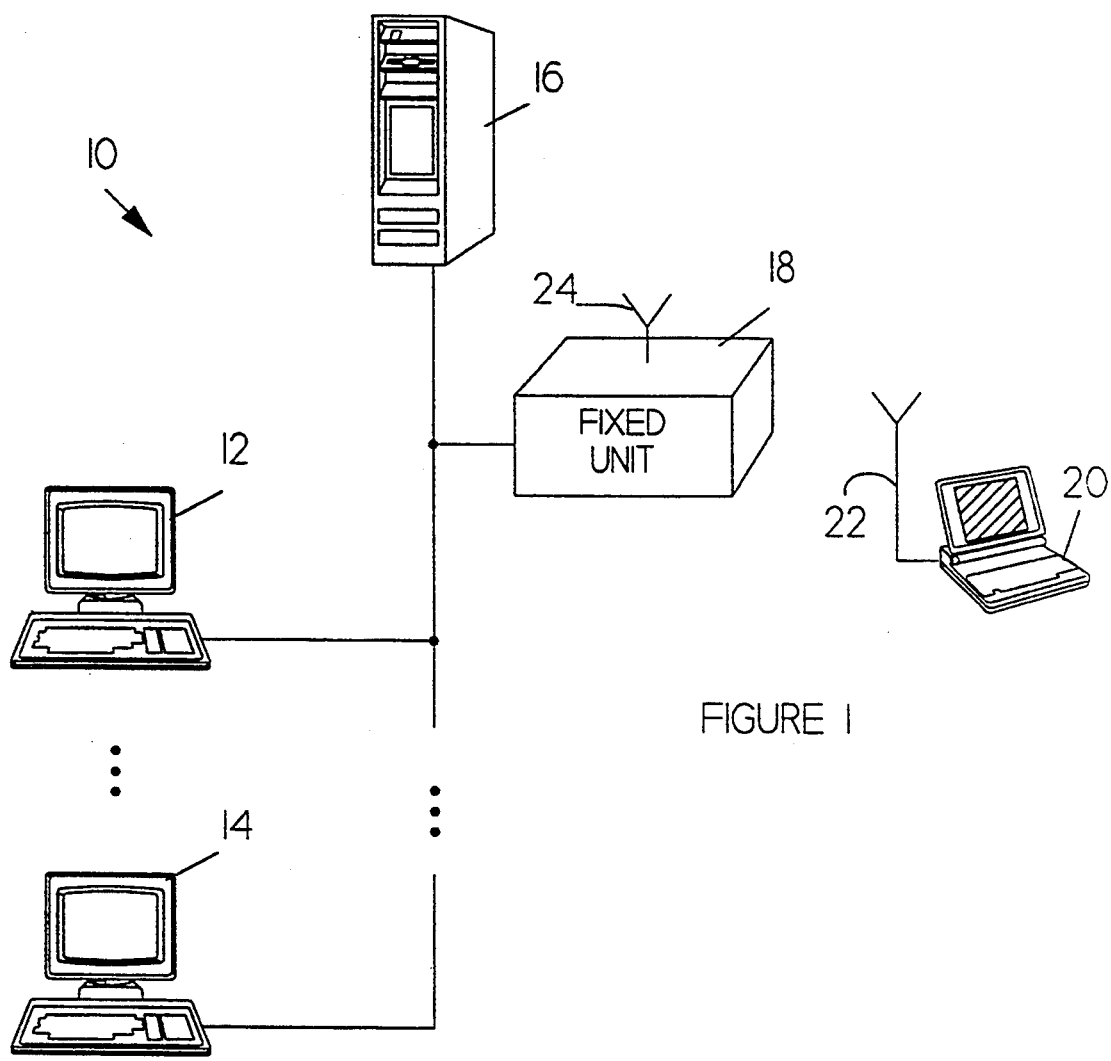
FIG. 1 illustrates a computer network employing the present invention.

The present invention is an enhancement of the conventional client/server architecture that is better optimized for handling the problems presented by a mobile client. Referring to FIG. 1 which is a block diagram of a network 10 utilizing the present invention. Network 10 utilizes a server 16 to service a number of fixed computers such as computer 12 and computer 14. The server communicates with each of the devices in the network by sending and receiving packets of binary information that will be referred to as "messages" in the following discussion. The present invention includes two units. The first unit, referred to as the fixed unit 18, remains attached to the computer network. The second unit, referred to as the mobile unit 20, accompanies the mobile user. Fixed unit 18 provides a single point of contact for the mobile client. By connecting to fixed unit 18, the client can receive network services such as E-mail and expanded data processing resources. When the client is not connected to fixed unit 18, the fixed unit stores network messages for the client, so that these messages are not lost. When the client reconnects to fixed unit 18, fixed unit 18 plays back these messages to the mobile unit 20 in the order in which they were received by fixed unit 18.

When the mobile unit is not connected to fixed unit 18, the fixed unit acts as a "surrogate client" for the server. Hence, the network functions as if the mobile client is attached to the extent that the computing capability of the fixed unit allows. For example, the fixed unit acknowledges the receipt of messages intended for the mobile client. Hence, the server does not "hang up" waiting for an acknowledgment.

In the preferred embodiment of the present invention, mobile unit 20 connects to fixed unit 18 via a radio frequency link as indicated by antennas 22 and 24. This arrangement eliminates the need to physically connect mobile unit 20 to fixed unit 18. As long as mobile unit 20 is within the range of the transmitters and receivers of the link, mobile unit 20 is connected to network 10 via fixed unit 18.

Figure 2:
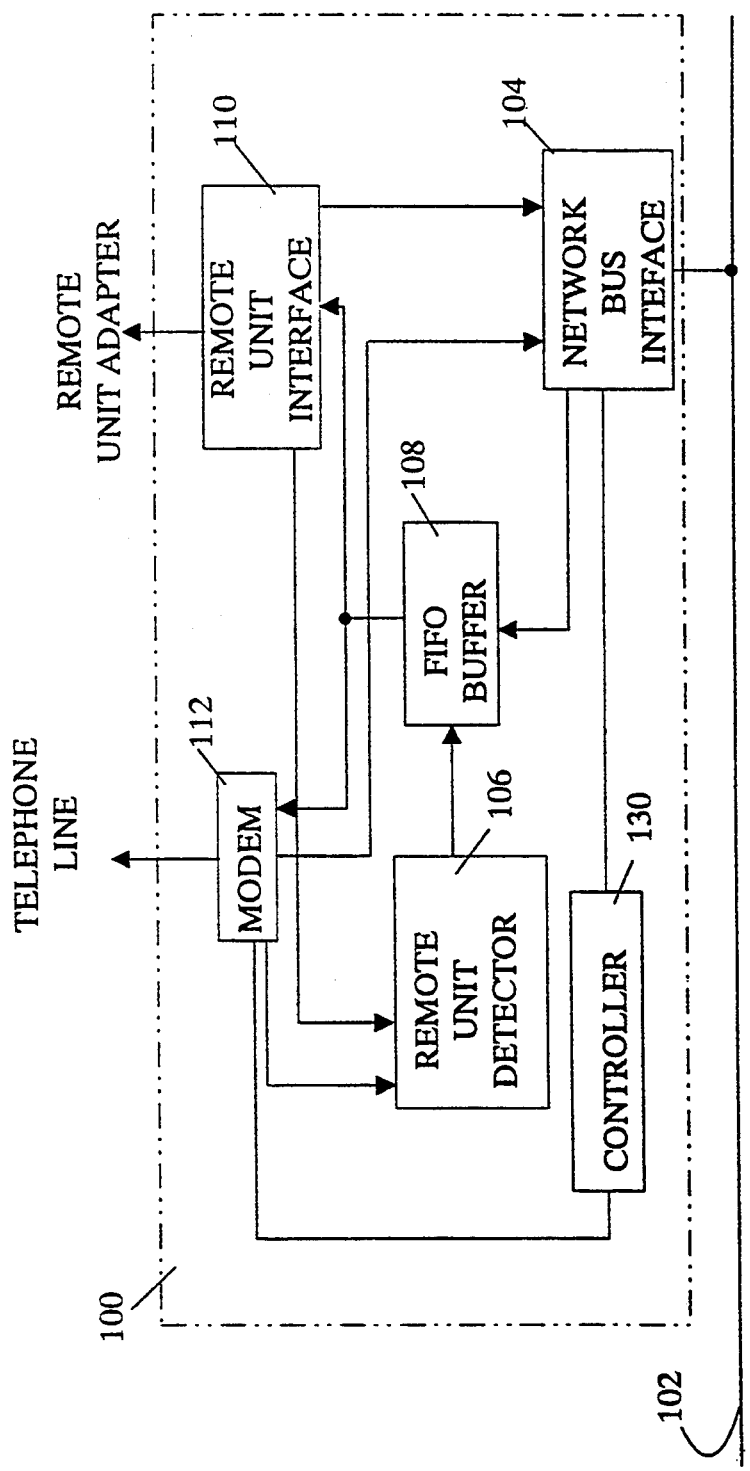
FIG. 2 is a block diagram of a fixed unit according to the present invention.

A more detailed block diagram of a fixed unit 100 according to the present invention is shown in FIG. 2. Fixed unit 100 is connected to a network bus 102 via interface circuit 104. Fixed unit 100 connects to the mobile unit either via a modem 112 or an interface circuit 110 which makes a direct connection to the mobile unit either by electrical conductors or a radio frequency interface. Fixed unit 100 utilizes a detection circuit 106 to determine if the mobile unit is connected thereto. Any network messages addressed to the mobile unit are stored in a FIFO buffer 108. The receipt of these messages is acknowledges by controller 130. When fixed unit 100 detects a mobile unit connected to it, the contents of FIFO buffer 108 are outputted to the mobile unit. If the connection to the mobile unit is broken, then detection circuit 106 causes the messages directed to the mobile unit to remain in FIFO buffer 108.

In addition to responding to messages on the network, controller 130 may also be used to carry out other tasks for the mobile unit. When the mobile unit is connected to fixed unit 100, the mobile unit can off-load certain tasks to fixed unit 100. For example, the mobile unit could off-load a document that is to be sent via FAX over modem 112. Controller 130 would store the document and make the modem connection at the appropriate time.

Accordingly, an improved computer interface system for connecting a mobile user to a network has been disclosed. Various modifications to the present invention will become apparent to those skilled in the art from the foregoing description and accompanying drawings. Accordingly, the present invention is to be limited solely by the scope of the following claims.

What is claimed is:

1. An adapter unit for connecting a mobile computer to a computer network, said mobile computer and said computer network communicating by exchanging messages, said adapter unit comprising:

network interface means, connected to said computer network, for connecting said adapter unit to said computer network;

mobile interface means for connecting said adapter unit to said mobile computer and for exchanging said messages therewith when said adapter unit is connected to said mobile computer;

means, connected to said mobile interface means, for detecting the presence of said mobile computer and for generating a mobile unit present signal indicative of the presence of said mobile computer;

buffer means connected to said network interface means, said detecting means, and said mobile interface means, for storing said messages from said computer network to said mobile computer and for copying said messages to said mobile interface means in the order said messages were received from said computer network in response to the generation of said mobile unit present signal; and control means, connected to said network interface means, for acknowledging receipt of said messages to said computer network if said mobile unit present signal is not generated, said acknowledgment being the same as that provided by said mobile computer to messages from said network when said mobile computer is connected to said mobile interface means and for causing said messages received from said computer network to be stored in said buffer means until said mobile unit present signal is generated.

2. The adapter unit of claim 1 wherein said mobile interface means further comprises a modem for connecting said mobile interface to said mobile computer via a telephone line.

3. The adapter unit of claim 1 wherein said mobile interface means comprises a radio frequency receiver and transmitter for connecting said mobile interface to said mobile computer by an RF signal.

* * * * *